Aug. 6, 1940.  T. J. AVARY  2,210,440
DANDELION EXTRACTOR
Filed April 7, 1938
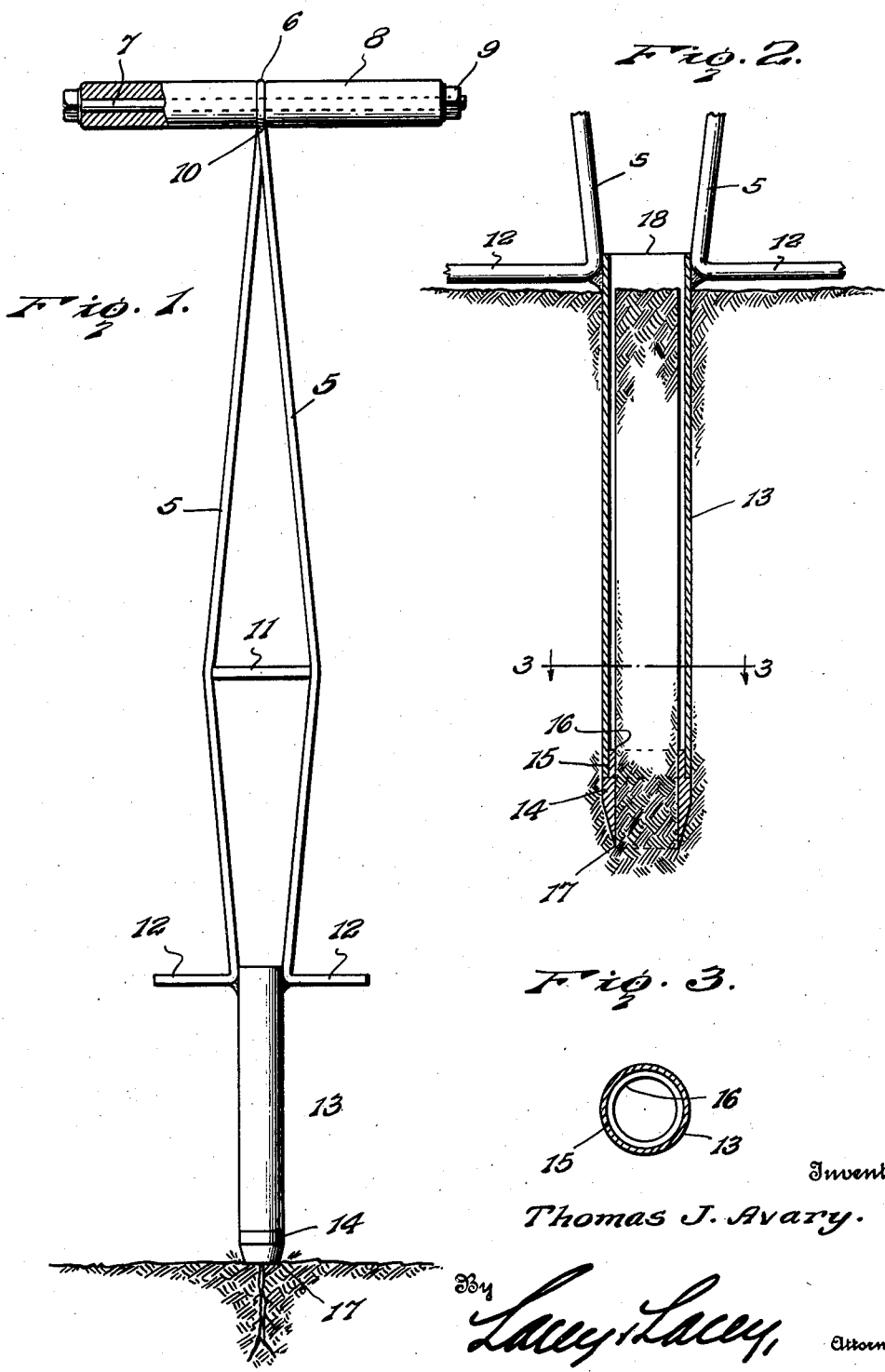
Inventor
Thomas J. Avary.
By Lacey & Lacey, Attorneys Patented Aug. 6, 1940

2,210,440

UNITED STATES PATENT OFFICE 2,210,440

DANDELION EXTRACTOR

Thomas J. Avary, Larned, Kans.

Application April 7, 1938, Serial No. 200,771

2 Claims. (Cl. 294—50.7)

This invention relates to weed pullers or extractors, and has for its object to provide a thoroughly efficient device of this character of inexpensive and compact construction, by means of which dandelions, weeds and other obnoxious growth may be conveniently extracted from the ground and subsequently destroyed so as to prevent further growth of the plants.

A further object of the invention is to provide a weed extractor, the construction of which is such that the initial operation of the tool will extract a dandelion or other weed from the ground, and a further use thereof will cause the first weed to be automatically ejected at the upper end of the receiving barrel.

A further object is to provide an implement of the class described comprising a truss frame having a handle at one end thereof and lateral foot supports at the other, there being a receiving barrel disposed at said foot supports and terminating in a tubular cutting member defining a stop shoulder disposed within the barrel whereby, when the tool is in operation, sufficient clearance will be provided within the barrel to permit the ready discharge of the plant and dirt adhering thereto through the upper end of said barrel.

A still further object of the invention is generally to improve this class of devices so as to increase their utility, durability and efficiency.

In the accompanying drawing forming a part of this specification and in which similar numerals of reference indicate corresponding parts in all the figures of the drawing:

Figure 1 is a side elevation of a weed extractor embodying the present invention showing the same in position over a dandelion and ready to extract the same.

Figure 2 is an enlarged vertical sectional view of the lower end of the plant ejector showing the construction of the tubular cutting member, and Figure 3 is a transverse sectional view taken on the line 3—3 of Figure 2.

The improved weed extractor forming the subject-matter of the present invention comprises a supporting frame 5 preferably formed from a single length of metal having its intermediate portion bent to form a supporting eye 6 adapted to loosely receive the transverse rod 7 of an operating handle indicated at 8. The handle 8 is preferably formed in two sections, one of which is disposed on each side of the eye 6 and the ends of the rod 7 are threaded for engagement with nuts 9 which bear against the handle sections and serve to retain said handle section in position. The metal at the base of the eye 6 is preferably welded or otherwise rigidly united, as indicated at 10, and thence extended downwardly to form diverging bars separated from each other by an intermediate brace 11, the metal being thence extended downwardly on converging lines and terminating in laterally extending foot supports 12. Rigidly secured to the frame 5 between the lateral foot supports 12 is a cylindrical receiving barrel 13 and fitted in the lower end of said receiving barrel is a tubular cutting member 14. The tubular cutting member 14 may be threaded, shrunk or otherwise fitted within the barrel 13, said tubular member having its upper end provided with a cutaway portion 15 adapted to receive the adjacent end of the barrel 13 and defining an internal annular shoulder 16. The outer portion of the tubular member is tapered downwardly to form a cutting edge 17 adapted to enter the ground around a dandelion or other weed to be extracted. It will here be noted that, due to the shoulder 16, the internal diameter of the tubular member is less than the internal diameter of the barrel 13 so that, when the dandelion or other weed is extracted, said weed together with the dirt adhering thereto is free to be discharged through the upper end 18 of said barrel.

In operation, the implement is positioned over a dandelion or other plant to be extracted and the cutting edge 17 of the tubular member 14 forced into the ground by exerting a downward pressure with the foot on either of the foot supports 12. The implement is then partially rotated to the right and to the left so as to loosen the earth around the dandelion or other weed and cause the same to be forced upwardly within the barrel 13. When the tool is again used for extracting a plant, the tubular cutting member is forced downwardly within the ground around the weed to be extracted in the manner before stated and the downward pressure exerted on the tubular member will cause the weed being extracted and the dirt surrounding the same to press upwardly on the weed or dandelion first extracted and force said first weed outwardly through the open upper end 18 of the barrel 13 and this operation will be repeated during each subsequent use of the tool. After the dandelions or other weeds have been extracted, the earth is removed therefrom and the weeds destroyed so as to prevent further growth of the obnoxious plants.

It will here be noted that, owing to the shape of the frame 5, said frame forms, in effect, a truss between the operating handle and lateral foot supports 12, which construction materially strengthens the implement while at the same time rendering it light in weight so that it can be easily operated and transported from place to place. The member 11 not only forms a transverse brace for the truss frame 5 but may, if desired, be used as an auxiliary handle to assist in forcing the tubular member within the ground when extracting a dandelion or other obnoxious weed therefrom.

It will, of course, be understood that the implements may be made in different sizes and shapes and constructed from any suitable material without departing from the spirit of the invention.

Having thus described the invention, what is claimed as new is:

1. A weed extractor comprising a frame formed of spaced bars converging longitudinally in opposite directions from a medial point thereof and having their upper ends connected to form a handle-receiving eye and their lower ends spaced apart and extended laterally to form foot supports, an intermediate transverse bar connecting said bars at said medial point, a handle extending through said eye, a receiving barrel interposed between the lower ends of the bars and secured thereto at said foot supports, and a tubular cutting member fitted in the lower end of the barrel.

2. A weed extractor comprising a frame formed of spaced bars converging longitudinally in opposite directions from a medial point thereof and having their upper ends connected to form a handle-receiving eye and their lower ends spaced apart and extended laterally to form foot supports, an intermediate transverse bar connecting said bars at said medial point, a handle extending through said eye, a receiving barrel fitting between the bars of the frame at said foot supports, and a tubular cutting member fitting within the barrel and having its outer end inclined downwardly to form a terminal cutting edge, the upper portion of the tubular member being cut away to form a seat for the receiving barrel and defining an annular shoulder disposed within and bearing against said barrel.

THOMAS J. AVARY.